United States Patent
Fantuzzi et al.

(10) Patent No.: US 11,241,794 B2
(45) Date of Patent: Feb. 8, 2022

(54) METHOD FOR THE SURFACE TREATMENT OF AN ARTICLE

(71) Applicant: GAIOTTO AUTOMATION S.P.A., Imola (IT)

(72) Inventors: Cesare Fantuzzi, Imola (IT); Cristian Secchi, Imola (IT); Federica Ferraguti, Imola (IT); Chiara Talignani Landi, Imola (IT); Marco Nolli, Imola (IT)

(73) Assignee: GAIOTTO AUTOMATION S.P.A., Imola (IT)

( * ) Notice: Subject to any disclaimer, the term of this patent is extended or adjusted under 35 U.S.C. 154(b) by 297 days.

(21) Appl. No.: 16/337,565

(22) PCT Filed: Sep. 28, 2017

(86) PCT No.: PCT/IB2017/055972
§ 371 (c)(1),
(2) Date: Mar. 28, 2019

(87) PCT Pub. No.: WO2018/060925
PCT Pub. Date: Apr. 5, 2018

(65) Prior Publication Data
US 2020/0030983 A1 Jan. 30, 2020

(30) Foreign Application Priority Data
Sep. 28, 2016 (IT) .................. 102016000097482

(51) Int. Cl.
*B25J 9/16* (2006.01)
*B25J 11/00* (2006.01)
(Continued)

(52) U.S. Cl.
CPC .......... *B25J 9/1679* (2013.01); *B25J 9/1633* (2013.01); *B25J 11/0075* (2013.01);
(Continued)

(58) Field of Classification Search
CPC .... B25J 9/1679; B25J 9/1633; B25J 11/0075; B25J 13/085; G05B 19/423;
(Continued)

(56) References Cited

U.S. PATENT DOCUMENTS 4,589,810 A * 5/1986 Heindl ..................... B25J 13/02
414/4
2009/0259412 A1 10/2009 Brogardh
(Continued)

FOREIGN PATENT DOCUMENTS

DE 3211992 A1 10/1983
FR 2435329 A1 4/1980
(Continued)

OTHER PUBLICATIONS

Office Action received for Japanese Patent Application No. 2019-537421, dated Jan. 12, 2021, 14 Pages (7 pages of English Translation and 7 pages of Original Document).
(Continued)

*Primary Examiner* — Basil T. Jos
(74) *Attorney, Agent, or Firm* — Workman Nydegger

(57) ABSTRACT

A method for the surface treatment of an article (2) by means of a robotic device (3) comprising a robotic arm (5) and a spraying head (4) fitted on the robotic arm (5); the method comprises a learning step, during which the operator moves the spraying head (4) by means of a handling device (9) and the movements made by the spraying head (4) are stored by a storage unit (8); and a reproduction step, which is subsequent to the learning step and during which the robotic arm (5) is operated so that the spraying head (4) repeats the movements stored by the storage unit (8).

18 Claims, 7 Drawing Sheets

(51) Int. Cl.
  *B25J 13/08* (2006.01)
  *G05B 19/423* (2006.01)
(52) U.S. Cl.
  CPC .......... *B25J 13/085* (2013.01); *G05B 19/423*
    (2013.01); *G05B 2219/36184* (2013.01); *G05B*
    *2219/36401* (2013.01); *G05B 2219/36442*
    (2013.01); *G05B 2219/45013* (2013.01); *G05B*
    *2219/45065* (2013.01)
(58) Field of Classification Search
  CPC .......... G05B 2219/36184; G05B 2219/36401;
    G05B 2219/36442; G05B 2219/45013;
    G05B 2219/45065; G05B 2219/39101;
    G05B 2219/39325; G05B 19/42; B28B
    17/0081; B28B 11/048
  See application file for complete search history.

(56) References Cited

U.S. PATENT DOCUMENTS

| | | |
|---|---|---|
| 2012/0123590 A1 | 5/2012 | Halsmer |
| 2013/0253702 A1 | 9/2013 | Lecours et al. |
| 2013/0345872 A1* | 12/2013 | Brooks .................. G06F 17/00 700/259 |
| 2016/0052128 A1 | 2/2016 | Zimmermann et al. |
| 2016/0243704 A1* | 8/2016 | Vakanski ................ B25J 9/1697 |

FOREIGN PATENT DOCUMENTS

| | | |
|---|---|---|
| JP | 05-318359 A | 12/1993 |
| JP | 2008-142810 A | 6/2008 |
| JP | 2009-072833 A | 4/2009 |
| KR | 10-2012-0132864 | 12/2012 |
| WO | 2007096322 A2 | 8/2007 |
| WO | 2009/096408 A1 | 8/2009 |

OTHER PUBLICATIONS

Office Action received for Japanese Patent Application No. 2019-537421, dated Jun. 2, 2020, 7 pages (Original Document only).
International Search Report and Written Opinion issued in PCT/IB2017/055972 dated Jan. 29, 2018.
Kubus et al. "Improving Force Control Performance by Computational Elimination of Non-Contact Forces/Torques" 2008 IEEE International Conference on Robotics and Automation, May 19, 2008, pp. 2617-2622.
Italian Search Report issued in Application No. 201600097482 dated Jun. 19, 2017.
Office Action received for European Patent Application No. 17791459, dated Jan. 20, 2021, 6 pages.

* cited by examiner

METHOD FOR THE SURFACE TREATMENT OF AN ARTICLE

CROSS REFERENCE TO RELATED APPLICATIONS

This application is a U.S. Nationalization of PCT Application Number PCT/IB2017/055972, filed on Sep. 28, 2017, which claims priority to IT Patent Application No. 102016000097482 filed on Sep. 28, 2016, the entireties of which are incorporated herein by reference.

TECHNICAL FIELD

The present invention concerns a method and a plant for the surface treatment of an article.

The present invention is advantageously applied in the field of enamelling of ceramic articles, to which the following description explicitly refers without loss of generality.

CONTEXT OF THE INVENTION

In the field of the working of ceramic articles, robotic devices are known to be used supporting spraying heads for painting and/or enamelling the surfaces.

This type of approach has a high versatility and effectiveness and has led to an increase in production speed and improvements in repeatability and precision of the industrial process.

In view of the fact that the same robot can paint and/or enamel articles of different shapes, the way in which it is "taught" how to act has become an increasingly important work step and should be as simple and intuitive as possible.

Currently, the most widely used teaching techniques are: point to point programming (PTP), off-line programming and programming by self-learning.

In point to point programming, the operator moves the robot from point to point, carrying out the movements which it will then replicate with the help of a control system (e.g. a control panel). However, this approach has several drawbacks including the following: to program the robot, the robot itself has to be used (thus resulting in production downtime) and programming is fairly laborious (the robot has to be moved to each point of the path and its position has to be saved); and in order to evaluate the result, the program must be completed and then run; if the result is not satisfactory, these operations must be repeated.

In off-line programming, the various actions of the robot are planned on a remote computer using a programming language and then sent to the robot.

The off-line and PTP programming methods are complex and laborious and this makes them particularly inefficient for the production of small and medium-sized batches.

Teaching techniques based on self-learning are simpler and more intuitive since they do not require knowledge of the robot programming language. However, in these cases, the programming phase requires the use of a robot suited to the programming method. The robot (complex and costly to produce) must be provided with appropriate mechanical, pneumatic or hydraulic balancing systems which allow the operator to carry out the self-learning programming with limited effort, relieving the operator as far as possible of the load due to the weight and inertia of the moving parts of the robot. In any case, the operator sustains a significant physical effort, which can make it difficult for him/her to impose precise movements on the robot.

The object of the present invention is to provide a method and a plant for the surface treatment of an article, which overcome, at least partially, the drawbacks of the known art and are, at the same time, easy and inexpensive to produce.

SUMMARY

According to the present invention, a method and a plant are provided for surface treatment according to the following independent claims and, preferably, in any one of the claims depending directly or indirectly on the independent claims.

In this text, by "torque" we mean "moment of a force" or in any case another quantity containing (more precisely, a function of) the moment of a force. "Moment of a force" (or "mechanical moment") has the common meaning of the aptitude of a force to impart a rotation to a rigid body around a point (in a plane) or an axis (in space) when said force is not applied to the centre of mass.

In this text, by "force" we also mean (in addition to the meaning normally given to this term) another quantity containing (more precisely, a function of) the force. According to some embodiments, "force" means force according to its normal meaning.

BRIEF DESCRIPTION OF THE FIGURES

The invention is described below with reference to the accompanying drawings, which illustrate some non-limiting embodiment examples, in which.

DETAILED DISCLOSURE

Figure 1:
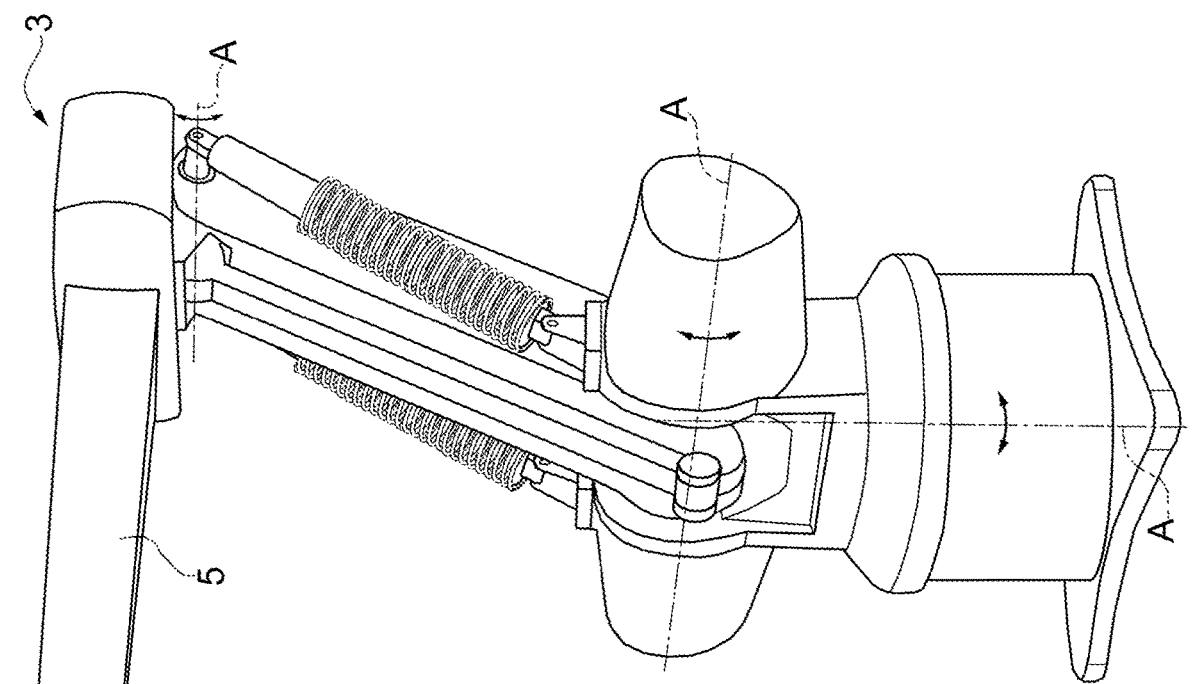
FIG. 1 is a perspective view with details removed for clarity of a plant according to the present invention.
Figure 1:
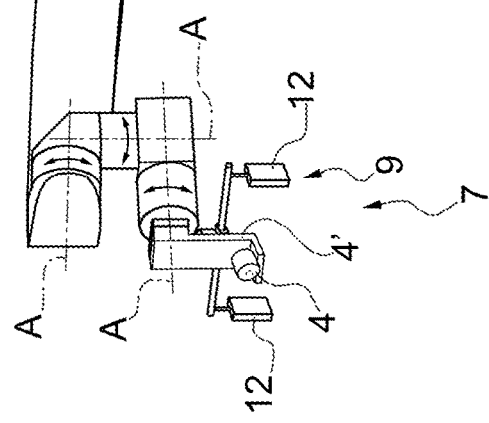
Figure 1:
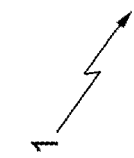
Figure 1:
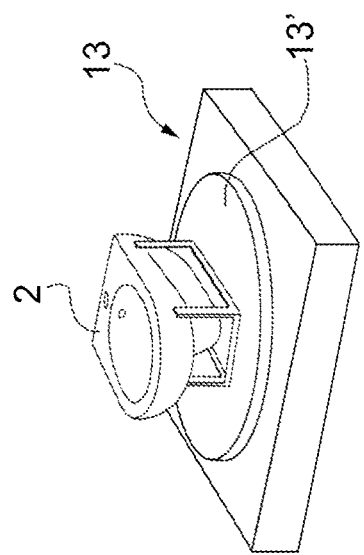
Figure 4:
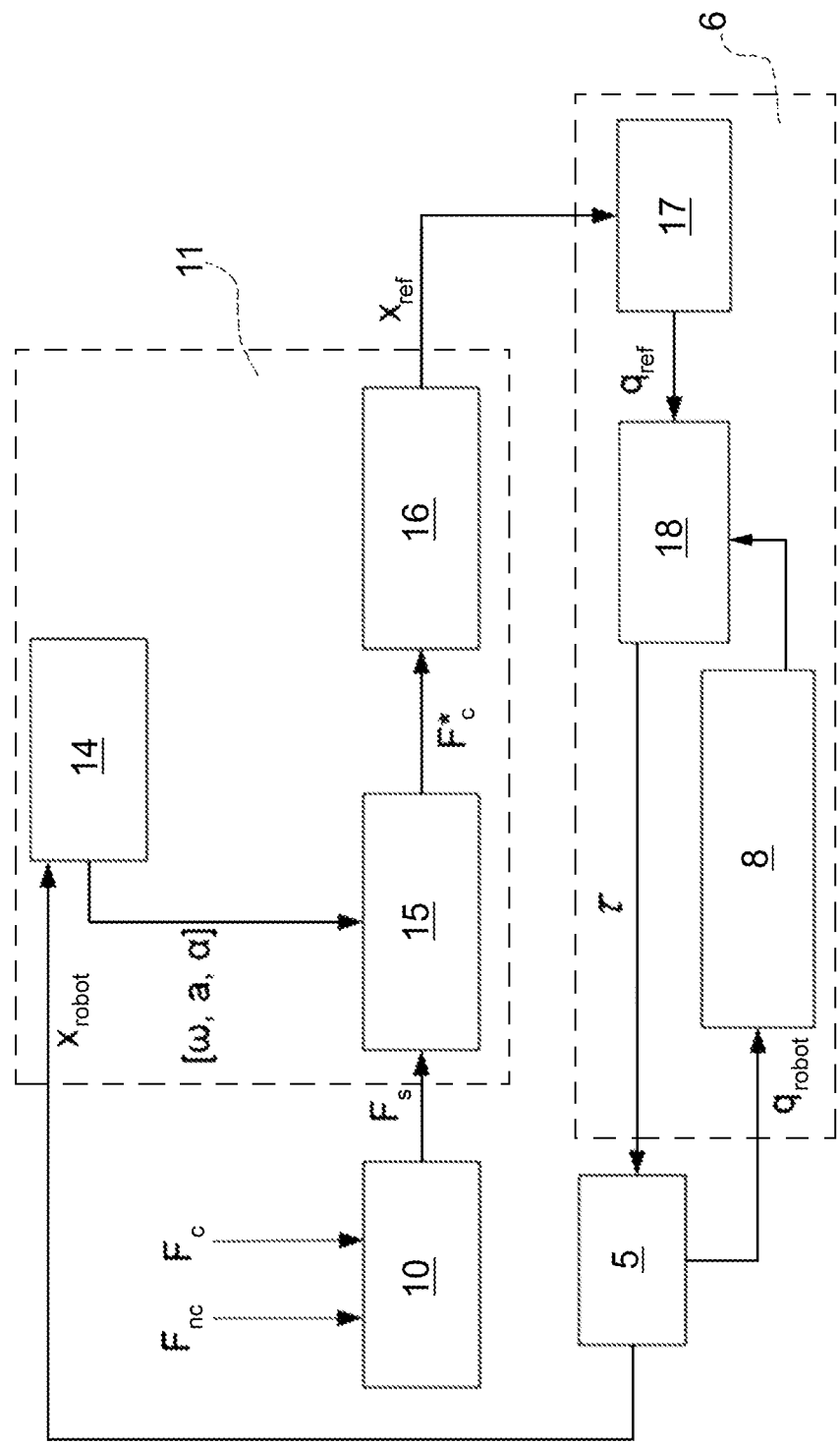
FIG. 4 is a schematic block diagram of a control system and a driving control assembly of the plant of FIG. 1.

In accordance with a first aspect of the present invention, in FIG. 1, the number 1 indicates overall a plant for the treatment of an article 2. The plant 1 comprises a robotic device 3 which, in turn, comprises a spraying head 4, which is designed to emit a jet of a substance for covering at least a part of the surface of the article 2; a robotic arm 5, which is movable with at least six degrees of freedom and on which the spraying head 4 is fitted; a control system 6 (FIG. 4); and a driving control assembly 7.

The control system 6 comprises a storage unit 8 and is designed to control the movement of the robotic arm 5 to move the spraying head 4. In particular, the control system 6 is also designed to adjust the operation of the spraying head 4.

The driving control assembly 7 is designed to be operated by an operator (not illustrated) to transfer movement indications for the robotic arm 5. In particular, the contact unit is also designed to transfer the operation indications for the spraying head 4.

Figure 2:
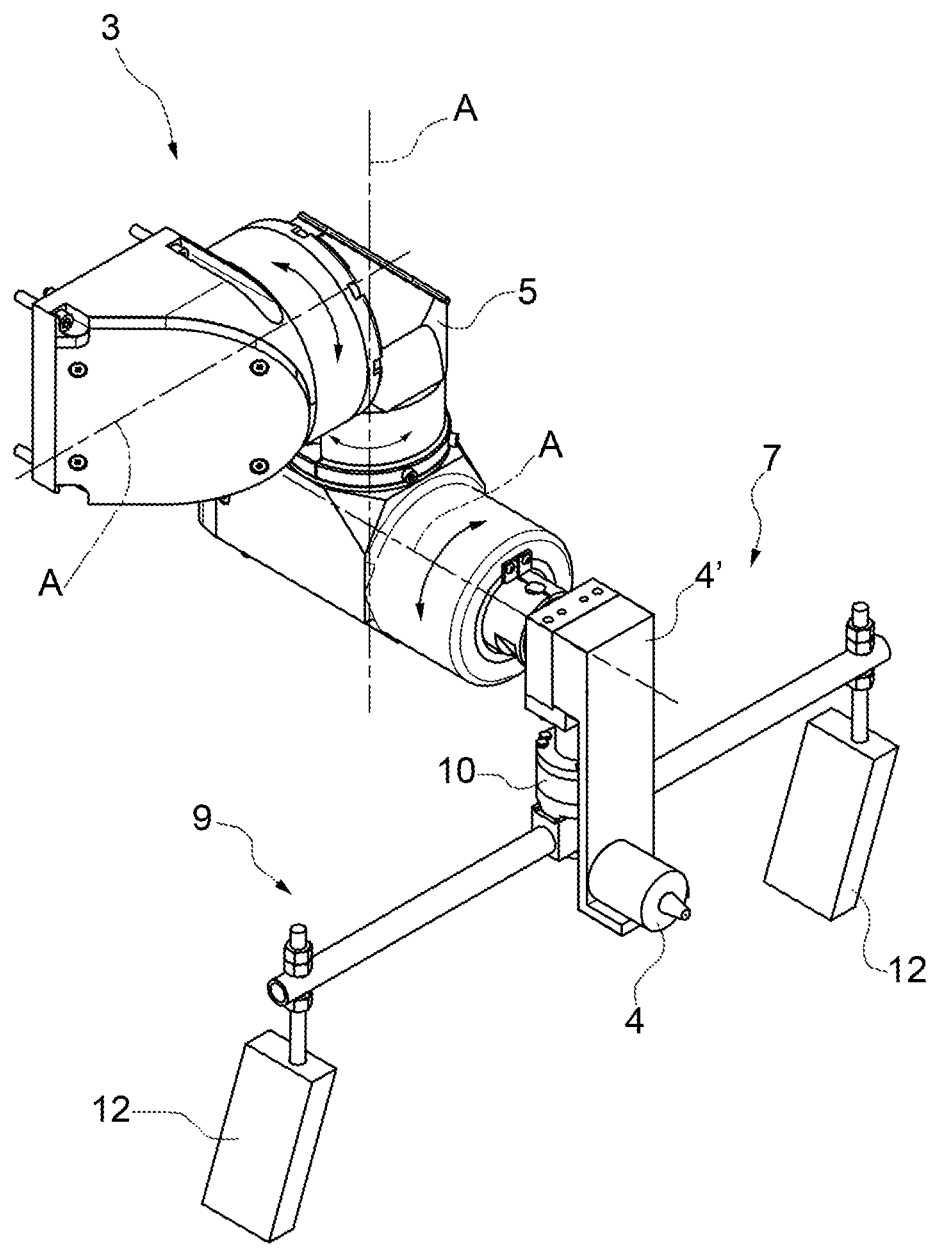
FIG. 2 is a perspective view on an enlarged scale of a detail of FIG. 1 in a different operating configuration.
Figure 3:
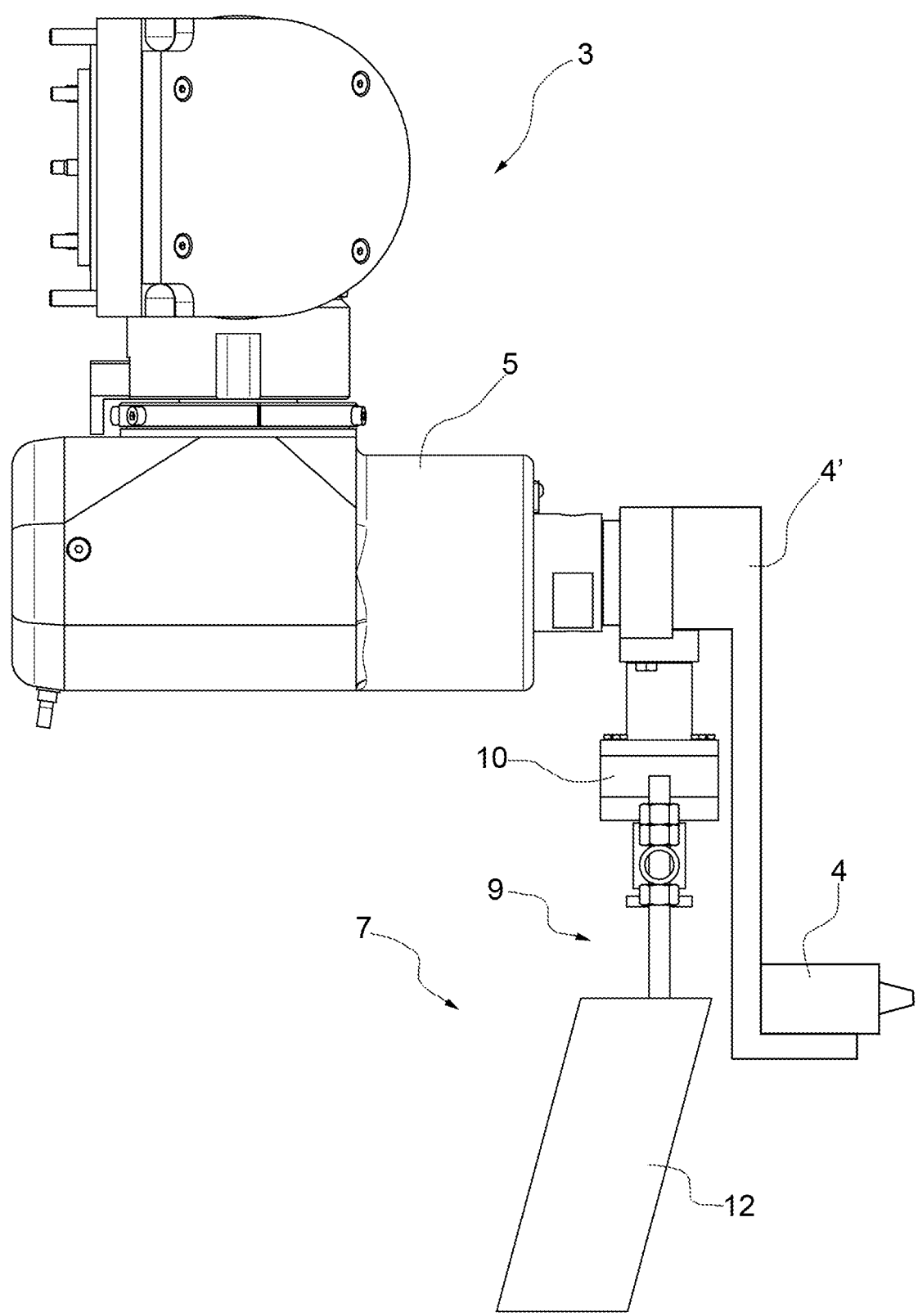
FIG. 3 is a lateral view on an enlarged scale of the detail of FIG. 2.

In particular, the robotic arm 5 (FIGS. 1 and 2) comprises several sections connected to one another in succession. Each section can be rotated with respect to the preceding one around a respective rotation axis A. The rotation around each of the axes A represents a degree of freedom of the robotic arm 5. In the embodiment illustrated, the robotic arm 5 has six degrees of freedom and, more precisely, six axes A of rotation.

The robotic arm 5 is typically an industrial type anthropomorphic robot, for example it can be the robot GA-OL by Gaiotto Automation SpA. The robotic arm 5 can also have more than six degrees of freedom (in particular, more than six rotation axes A). In some cases, the degrees of freedom can be five axes of rotation and a translation (for example horizontal or vertical).

The driving control assembly 7 comprises a handling device 9 on which, in use, the operator exerts a force and a torque $F_c$ (FIG. 4); a sensor 10, which is connected to the handling device 9 and is designed to detect the force and the torque $F_s$ applied to the handling device 9; and a processing system 11, which is designed to provide movement indications for the robotic arm 5 as a function of the items detected by the sensor (more precisely as a function of the force and torque $F_s$ detected).

In particular, the sensor 10 has (at least) six degrees of freedom and is able to measure (at least) three forces and three torques (in a Cartesian reference system). The sensor can be any known device able to perform the functions described above.

According to specific non-limiting embodiments, the sensor 10 is, for example, the FTSens which, having measured three forces and three torques, is able to transmit them in digital format on a CAN network. FTSens has been developed by IIT (Italian Institute of Technology) of Genoa. In this case, the measurements are taken using strain gauge technology, based on the deformation of strain gauges (of electrical/resistance type) located inside the body of the sensor.

The FTSens sensor is provided with a DSP 16-bit microcontroller (dsPIC30F4013), able to sample up to six analog channels, and an analog-digital converter connected to the six channels. The DSPic deals with the synchronization and sampling, transmission of the digital data to the CAN, filtering and transformation of the signal read by the strain gauges into forces and torques, via multiplication by the transformation matrix characteristic of the sensor.

According to further examples, the sensor 10 is the Mini 45 by ATI, provided with force/torque sensors with 6 axes which allow measurement of all six force and torque components (Fx, Fy, Fz, Mx, My, Mz) via the use of a transducer. The ATI sensors are provided with silicon strain gauges, which provide excellent immunity to disturbances. The communication interface with the sensor can be made by using one of the following protocols: FTN (Ethernet, also with ProfiNet option), FTD (PCI, USB), FTS (analog voltage 0-10 V, DIO) or FTW (Wireless).

The storage unit 8 is designed to store the grobot movements made by the robotic arm 5 while the spraying head 4 is moved by the operator by means of the driving control assembly 7. The control system 6 is designed to control the movement of the robotic arm 5 as a function of the grobot movements stored by the storage unit 8. In particular, the control system 6 is designed to control the movement of the robotic arm 5 so that the robotic arm 5 (and the spraying head 4) substantially repeats the grobot movements stored by the storage unit 8, more specifically so that the spraying head 4 substantially repeats the movements carried out while the operator moves the spraying head 4.

In particular, in the present text, by "movement" or "movements" we mean a path and the speed along the path.

More precisely, the movement of the robotic arm 5 is the movement in space of each movable part of the robotic arm 5 in space.

In particular, the handling device 9 is fitted on the robotic arm 5 (more specifically, on the sensor 10). Advantageously but not necessarily, the handling device 9 is fitted on the robotic arm 5 in the area of the spraying head 4, in particular in the area of an end of the robotic arm 5. More precisely, the handling device 9 is connected to the robotic arm 5 via the sensor 10 (which supports the handling device 9). According to some embodiments, the sensor 10 is fitted on the robotic arm 5.

More in particular, the sensor 10 is arranged on the robotic arm 5 between the handling device 9 and the position in which the spraying head 4 is fitted on the robotic arm 5. In this way, the sensor 10 does not detect static or dynamic effects relative to the spraying head 4 (and, therefore, processing of the data detected by the sensor 10 is simpler and more accurate).

In particular, the handling device 9 (more precisely the sensor 10) is fitted on the robotic arm 5 between the spraying head and the cited (at least six) degrees of freedom.

In particular, the handling device 9 comprises at least a handgrip 12, which is designed to be grasped by the operator to move the robotic arm 5 (and, therefore, the spraying head 4).

According to some non-limiting embodiments, the handling device 9 comprises (at least) two handgrips 12, which are designed to be grasped by the operator to move the robotic arm 5 (and, therefore, the spraying head 4) and are connected to one another in an integral manner, in particular by means of a connection element (of the handling device 9). More specifically, the connection element comprises (more precisely is) a bar transverse to the handgrips 12. In these cases, advantageously but not necessarily, the transverse bar is fitted on the sensor 10; more precisely, the transverse bar is between the sensor 10 and the handgrip/s 12.

In particular, the spraying head 4 is fitted on the robotic arm 5 by means of a support 4', which projects from the robotic arm 5 (in particular, from one end of the robotic arm 5).

According to some embodiments (like the one illustrated on pages 1 to 4), the support 4' has a first end connected to the robotic arm 5, extends (downwards) beyond the sensor 10 and has a coupling area (at a second end opposite the first end) to which the spraying head 4 is connected. The sensor 10 is arranged between the handling device 9 and the first end. According to some non-limiting embodiments, the support 4' extends between the two handgrips 12. In these cases, the spraying head 4 is arranged between the two handgrips 12.

According to alternative embodiments (like the one in FIG. 9), the support 4' extends from the robotic arm 5 substantially in a horizontal direction.

According to some non-limiting embodiments, the driving control assembly 7 (in particular, the handling device 9) comprises controls (for example, push-buttons, levers etc.) which are designed to be operated by the operator to adjust over time at least one operating parameter of the spraying head 10. The storage unit 8 is designed to store the adjustment of the operating parameter (and the variation thereof in time); the control system 6 is designed to adjust operation of the spraying head 4 so that the adjustment of the operating parameter (and the variation thereof in time) stored is substantially repeated, in particular in a manner coordinated with the movements made by the robotic arm 5.

According to some non-limiting embodiments, the driving control assembly 7 is designed to provide indications on the operating parameter (and the variation thereof over time) to the control system 6, which is designed to operate the spraying head 4 as a function of the indications received from the driving control assembly 7.

Advantageously but not necessarily, the operating parameter is chosen from the group consisting of: adjustment of the flow (quantity per time unit) of the covering substance coming out of the spraying head 4, adjustment of the degree of pulverization of the covering substance coming out of the spraying head 4, adjustment of the width of the jet of covering substance coming out of the spraying head 4, adjustment of the shape of the jet of covering substance coming out of the spraying head 4 (and a combination thereof).

According to some non-limiting embodiments, said operating parameter is chosen from the group consisting of: adjustment of the flow (quantity per time unit) of the covering substance coming out of the spraying head 4, adjustment of the degree of pulverization of the covering substance coming out of the spraying head 4, adjustment of the width (or shape) of the jet of the covering substance coming out of the spraying head 4 (and a combination thereof).

According to specific embodiments, said operating parameter is the adjustment of the flow of covering substance coming out of the spraying head 4. The operating parameter can also simply be activation (on) and de-activation (off) of the jet.

In some cases (and not necessarily), the driving control assembly 7 (in particular, the handling device 9) comprises a control for enabling movement of the robotic arm 5 (normally called "dead man" in technical jargon) and allows stoppage of the robotic arm 5 in the event of an emergency. Typically, this command comprises a push-button which must be kept pressed by the operator until the robotic arm 5 is enabled to move. If, in use, this push-button is released or pressed for too long, the control system 6 disables the possibility of movement of the robotic arm 5.

According to some non-limiting embodiments, the plant 1 also comprises a device 13 for movement of the article 2; the driving control assembly 7 (in particular, the handling device 9) comprises a command (e.g. a push-button or a lever) designed to be operated by the operator to control the device 13 for movement of the article 2. In these cases, the storage unit 8 is designed to store the position (orientation) of the article 2 set by the operator (and the variation thereof in time). The control system 6 is designed to adjust the operation of the device 13 for movement of the article 2 on the basis of the position (orientation) of the article 2 (and the variation thereof in time) stored in the storage unit 8. More specifically, the control system 6 is designed to adjust the operation of the device 13 for movement of the article 2 so as to repeat the position (orientation) of the article 2 (and the variation thereof in time) stored in the storage unit 8.

According to some non-limiting embodiments (like the one illustrated), the device 13 comprises a rotating platform 13' on which, in use, the article 2 is arranged. In particular, the platform 13' rotates around a vertical axis (not illustrated).

Advantageously but not necessarily, the processing system 11 is designed to estimate a non-contact force and torque $F_{nc}$ as a function of static and dynamic components resulting from the load (in particular, the handling device 9) of what is fitted on (more precisely, supported by) the sensor 10 (more precisely, a sensitive part of the sensor 10) and is designed to obtain an estimated force and torque $F^*_c$ (of what is applied by the operator on the handling device 9) as a function of the force and torque $F_s$ detected (sum of $F^*_c$ and $F_{nc}$) and of the estimated non-contact force and torque $F_{nc}$. In these cases, the processing system 11 is designed to provide movement indications for the robotic arm 5 as a function of the force and torque $F^*_c$ estimated by the processing system 11. In particular, the force and torque $F^*_c$ are estimated by subtracting the non-contact force and torque $F_{nc}$ from the detected force and torque $F_s$.

In particular, it should be noted that all the forces and torques indicated above ($F_{nc}$, $F^*_c$, $F_c$ and $F_s$) have components in the three dimensions of Cartesian space.

According to some non-limiting embodiments, the static and dynamic components resulting from the load comprise gravity and inertial and Coriolis forces. In particular, the static components comprise the gravity. In particular, the dynamic components are estimated (at least partly) as a function of the angular speed $\omega$, angular acceleration $\alpha$, linear acceleration a and inertia (in particular, of the handling device 9) of what is fitted on (more precisely, supported by) the sensor 10.

Advantageously but not necessarily, the processing system 11 comprises a processing unit 14, which is designed to estimate (calculate) the angular speed $\omega$, the angular acceleration $\alpha$ and the linear acceleration a as a function of the Xrobot application (i.e. the configuration for each axis of rotation A) of the robotic arm 5. According to some specific non-limiting embodiments, the processing unit 14 comprises (in particular is) a Kalman filter.

These parameters can be obtained directly from the encoders present on the robotic arm, or via additional accelerometers positioned on the robotic arm 5. Experimental results show that the measurements obtained from the encoders are more accurate.

According to some non-limiting embodiments, the processing system 11 also comprises a compensation unit 15 which is designed to estimate the force and the torque $F^*_c$ as described above. In particular, the compensation unit 15 is connected to the processing unit 14 and is designed to receive from it the angular speed $\omega$, the angular acceleration $\alpha$ and the linear acceleration a.

Advantageously but not necessarily, the processing system 11 also comprises a control system 16, which is designed to calculate a reference position $X_{ref}$ (the position of the movable end of the robotic arm 5, on said end of which, in particular, the driving control assembly 7 is fitted) as a function of the force and torque $F^*_c$ (received from the compensation unit 15).

In some non-limiting cases, the control system 16 comprises (is) an admittance control or an impedance control. Advantageously but not necessarily, the control system 16 comprises (is) an admittance control. The admittance control provides a high level of accuracy in the non-contact tasks.

In particular, in a specific configuration thereof, the admittance control causes the robot to interact with the environment according to a mass damping system characterized by the following equation:

$$M_d\ddot{x}+D_d\dot{x}=F_s \qquad (A)$$

in which $M_d$ and $D_d$ are the matrix of the desired inertia and damping, $\ddot{x}$ is the Cartesian speed and $\dot{x}$ is the Cartesian acceleration.

However, as known in the literature, since interaction with the user can lead to instability, the admittance control parameters are advantageously but not necessarily varied and therefore the inertia and damping are variable in time and not constant. The variable admittance model is, according to some non-limiting embodiments, the following:

$$M_d(t)\ddot{x} + D_d(t)\dot{x} = F_s \tag{B}$$

According to some non-limiting embodiments, the control system 6 comprises inverse kinematics 17, which is designed to determine the position (movements) $q_{ref}$ for each degree of freedom to reproduce the reference position $X_{ref}$ (which, in use, is provided by the processing system 11—in particular, by the control system 16—to the control system 6—in particular, to the inverse kinematics 17). More precisely, the control system 6 (in particular, the inverse kinematics 17) is designed to determine the angular position (of each section) around each axis A.

In particular, the control system 6 also comprises a position control 18 which is designed to provide the actuation torque to move the robotic arm 5 in the desired position (in other words, to reproduce the reference position $X_{ref}$). More precisely, the position control 18 operates on the basis of the position $q_{ref}$ provided by the inverse kinematics 17.

Note that, according to different embodiments, the various components of the processing system 11 (the processing unit 14, the compensation unit 15, the control system 16) and the different components of the control system 6 (inverse kinematics 17, position control 18) can be understood as physical devices or as parts of a software system that operate as described above.

For the sole purpose of making operation of the plant 1 more comprehensible, some operating phases are summarized below. The sensor 10 measures the force and the torque $F_s$, composed of the force actually exerted by the operator (contact force and torque $F_c$) and by the static and dynamic components resulting from the load (non-contact forces and torques $F_{nc}$). $F_s$ is transmitted to the load compensation unit 15, which performs an estimate of the non-contact forces and torques $F_{nc}$ (weight force, inertial, gravitational and Coriolis forces) and obtains an estimate of the force exerted by the operator ($F^*_c$). The angular speed $\omega$, the linear acceleration $a$ and the angular acceleration $\alpha$ provided by the processing unit 14 (Kalman filter) and calculated on the basis of the robot position are used, together with the load inertia matrix (based also on the coordinates of the centre of mass), for estimate of the forces and torques $F_{nc}$. The contact force $F^*_c$ enters the control system 16 (admittance control), which calculates the reference position $X_{ref}$ for the position control 18. Since the position is expressed in Cartesian space, it is expedient for the inverse kinematics 17 to calculate the corresponding angular position around the axes A. Lastly, the position control 18 provides the actuation torque to the joints to move the robotic arm 5 to the desired reference position $X_{ref}$. To program the system in a complete manner, it is advantageous for the angular positions around each axis A to be recorded by the storage unit 8 during execution of the trajectory, together with the painting data.

Some aspects of the operation of the plant 1 will be explained in further detail with reference to a second aspect of the present invention described below.

According to some non-limiting embodiments, the plant 1 (in particular, the robotic device 3) is designed to implement the method as per the second aspect of the present invention.

In accordance with to the second aspect of the present invention, a method is provided for the surface treatment of an article 2 by means of a robotic device 3, which performs the same functions and comprises the same components as the robotic device 3 described in the ambit of the first aspect of the present invention. More precisely, the robotic device 3 is like the one described according to the first aspect of the present invention. In particular, the robotic device 3 is part of the plant 1 of the first aspect of the present invention.

The method comprises a learning step, during which the operator moves the spraying head 4 by means of the driving control assembly 7 and the movements made by the spraying head 4 are stored by the storage unit 8; and a reproduction step, which is subsequent to the learning step and during which the control system 6 operates the robotic arm 5 so that the spraying head 4 substantially repeats the movements stored by the storage unit 8 (in particular, carried out during the learning step).

During the learning step, the operator exerts a force and a torque on the handling device 9; the sensor 10 detects the force and torque applied to the handling device 9; and the processing system 11 (in particular, using the Kalman filter) provides movement indications for the robotic arm 5 as a function of the items detected by the sensor 10. In particular, during the learning step, the operator grasps the handling device 9.

In particular, the Kalman filter is used during the learning step.

More precisely, the Kalman filter is used at the input (to the processing system 11) to filter (all the) stochastic noises generated by the movements of the operator (which are not always precise).

Additionally or alternatively, the Kalman filter is (also) used during the reproduction step. For example, in this regard if, in use, an object knocks against the robot, the Kalman filter by-passes the impact read on the encoders and continues its movement normally.

Advantageously but not necessarily, during the learning step, the processing system 11 estimates a non-contact force and torque $F_{nc}$ as a function of static and dynamic components resulting from the load (in particular, of the handling device) of what is fitted on (more precisely, supported by) the sensor 10 (more precisely, on a sensitive part of the sensor 10) and obtains the estimated force and torque $F^*_c$ (applied by the operator on the handling device 9) as a function of the force and torque $F_s$ detected and the estimated non-contact force and torque $F_{nc}$. In these cases, the processing system 11 provides movement indications for the robotic arm 5 as a function of the force and torque $F^*_c$ estimated and provided by the processing system 11. In particular, the force and torque $F^*_c$ are estimated by subtracting the non-contact force and torque $F_{nc}$ from the detected force and torque $F_s$.

According to some non-limiting embodiments, the static and dynamic components resulting from the load comprise gravity and inertial and Coriolis forces. In particular, the dynamic components are estimated as a function of the angular speed $\omega$, angular acceleration $\alpha$, linear acceleration $a$ and inertia (inertia tensor) of what is fitted on (more precisely, supported by) the sensor 10 (more precisely, on a sensitive part of the sensor 10).

In particular, the inertia, more precisely the inertia tensor, is a matrix. More specifically, the matrix is $$s_I = \begin{bmatrix} s_{I_{xx}} & s_{I_{xy}} & s_{I_{xz}} \\ s_{I_{xy}} & s_{I_{yy}} & s_{I_{yz}} \\ s_{I_{xz}} & s_{I_{yz}} & s_{I_{zz}} \end{bmatrix}. \tag{1}$$

Such a matrix is present in the Newton-Euler equations on the movement of a rigid body subject to external forces:

$$^Sf = m^Sa - m^Sg + ^S\alpha \times m^Sc + ^S\omega \times (^S\omega \times m^Sc)$$

$$^S\tau = ^SI^S\alpha + ^S\omega \times (^SI^S\omega) + m^Sc \times ^Sa - m^Sc \times ^Sg \tag{2}$$

and to obtain it, the Huygens-Steiner theorem must be applied, adding the contribution relative to translation of the rotation axes to the inertia tensor referring to the centre of gravity $^G I$ (Bruno Siciliano, Lorenzo Sciavicco, Luigi Villani, and Giuseppe Oriolo. Robotics: modelling, planning and control. Springer Science & Business Media, 2010")

$$^S I = {}^G I + m S^T S \quad (3).$$

The matrix operator $S(\cdot)$ is defined as:

$$S = \begin{bmatrix} 0 & -c_z & c_y \\ c_z & 0 & -c_x \\ -c_y & c_x & 0 \end{bmatrix} \quad (4)$$

wherein the components of the vector c represent the distance between the centre of mass of the object and the origin of the reference system of the sensor 10.

The forces and torques measured $^S f$, $^S \tau$ (corresponding to $F_s$), the linear acceleration vectors $^S a$ (above and in FIG. 4 indicated as a) and angular acceleration vectors $^S \alpha$ (above and in FIG. 4 indicated as α), the angular speed vector $^S \omega$ (above and in FIG. 4 indicated as ω), the gravity vector $^S g$, the coordinates of the centre of mass $^S c$ and the inertia matrix $^S I$ are expressed in the reference system S of the sensor 10.

The equations 2 can be rewritten as:

$$\begin{bmatrix} {}^s f \\ {}^s \tau \end{bmatrix} = {}^S V({}^s a, {}^s \alpha, {}^s \omega, {}^s g) {}^s \varphi \quad (5)$$

Wherein $$^S V = \begin{bmatrix} a_x - g_x & -\omega_y^2 - \omega_z^2 & \omega_x \omega_y - \alpha_z & \omega_x \omega_z + \alpha_y & 0 \\ a_y - g_y & \omega_x \omega_y + \alpha_z & -\omega_x^2 - \omega_z^2 & \omega_y \omega_z - \alpha_x & 0 \\ a_z - g_z & \omega_x \omega_z - \alpha_y & \omega_y \omega_z + \alpha_x & -\omega_y^2 - \omega_x^2 & 0 \\ 0 & 0 & a_z - g_z & g_y - a_y & \alpha_x \\ 0 & g_z - a_z & 0 & a_x - g_x & \omega_x \omega_z \\ 0 & a_y - g_y & g_x - a_x & 0 & -\omega_x \omega_y \end{bmatrix}$$

$$\begin{bmatrix} 0 & 0 & 0 & 0 & 0 \\ 0 & 0 & 0 & 0 & 0 \\ 0 & 0 & 0 & 0 & 0 \\ \alpha_y - \omega_x \omega_z & \alpha_z + \omega_x \omega_z & -\omega_y \omega_z & \omega_y^2 - \omega_z^2 & \omega_y \omega_z \\ \alpha_x + \omega_y \omega_z & \omega_z^2 - \omega_x^2 & \alpha_y & \alpha_z - \omega_x \omega_y & -\omega_x \omega_z \\ \omega_x^2 - \omega_y^2 & \alpha_x - \omega_y \omega_z & \omega_x \omega_y & \alpha_y + \omega_x \omega_z & \alpha_z \end{bmatrix}$$
(6)

The vector $^S \varphi$ contains the complete set of inertia parameters of the load:

$$^S \varphi = [m, {}^S c_x, {}^S c_y, {}^S c_z, {}^S I_{xx}, {}^S I_{xy}, {}^S I_{xz}, {}^S I_{yy}, {}^S I_{yz}, {}^S I_{zz}]^T \quad (7)$$

Once the elements of the vector $^S \varphi$, i.e. the mass of the load m, the position of the centre of mass $^S c = [{}^S c_x; {}^S c_y; {}^S c_z]$, the inertia tensor $^S I$ and the matrix $^S V$ are known, the non-contact force and torsional moment $F_{nc}$ is obtained from the equations (2) as follows:

$$\begin{bmatrix} {}^s f_{nc} \\ {}^s \tau_{nc} \end{bmatrix} = {}^S V({}^s a, {}^s \alpha, {}^s \omega, {}^s g) {}^s \varphi \quad (8)$$

The contribution resulting from the load dynamics is then subtracted from the measurement of the sensor 10, thus obtaining an estimate of the effective force and moment of contact $F_c$. This value is then entered in the admittance control to obtain the reference application $X_{ref}$ used by the control system 6 to provide the desired dynamics.

The matrix $^S V$ does not take account of the thermal drift and the offset of the sensor 10. Two strategies, for example, are possible to compensate this effect: either the values measured are re-set considering the orientation of the sensor and of the associated frame, or the offset can be estimated directly by increasing the number of parameters of the matrix $^S \varphi$. Advantageously but not necessarily, the first method is implemented by performing a calibration every time the thermal drift significantly alters the force recorded by the sensor. The calibration operation is integrated in the robotic device 3.

To perform the calibration without having to remove the load every time, the terms relative to the offset are calculated considering the mass and orientation of what is fitted on the sensor 10. A pseudo-gravitational term is constructed which takes account of these factors:

$$F_{g_{init}} = {}^s V(0, 0, 0, {}^s g_{init}) {}^s \varphi \quad (9)$$

$$\begin{bmatrix} f_{g_{init}} \\ \tau_{g_{init}} \end{bmatrix} = \begin{bmatrix} m\, {}^S g_x \\ m\, {}^S g_y \\ m\, {}^S g_z \\ m\, {}^S c_y\, {}^S g_z - m\, {}^S c_z\, {}^S g_y \\ -m\, {}^S c_x\, {}^S g_z + m\, {}^S c_z\, {}^S g_x \\ m\, {}^S c_x\, {}^S g_y - m\, {}^S c_y\, {}^S g_x \end{bmatrix} \quad (10)$$

Since the mass and inertia values of the load which are inserted in the vector $^S \varphi$ are not precise, it is expedient to consider them as estimates subject to uncertainty on the parameters (i.e. $^S \hat{\varphi} = {}^S \varphi \pm \Delta^S \varphi^e$) and to an error deriving from the processing unit 14. The contact forces/torques $F_c$ can therefore be re-written as follows:

$$F_c = F_s - F_{nc} + F_{g_{init}} \quad (11)$$

The simplest way of managing these uncertainties is to apply a threshold: if the estimate is below a fixed value, it must be considered zero. The limit of this method is the need to find the right compromise between sensitivity and incorrect detection of the contact force. The solution is to use an adaptive threshold, exploiting the linearity of the equation 8:

$$F_{th} = |{}^S V({}^S a, {}^S \alpha, {}^S \omega, {}^S g) \Delta \varphi| + F_{min} \quad (12)$$

where $F_{min}$ represents a fixed safety margin.

A further aspect to be advantageously (but not necessarily) considered for detecting the contact force is the spectral content of the signal.

Some studies show that intentional human inputs have a dominant frequency in the band from 0 to 5 Hz, whereas accidental impacts are usually represented by peaks at high frequencies (greater than 10 Hz). Since the objective is to exploit the former to provide an input to the control system 16, a low-pass filter is used on the output of the equation 11, obtaining a filtered contact force and torsional moment $F_{cf}$ which takes account of the intentional movements of the operator, eliminating the accidental impacts.

The resulting force and torsional moment after application of the adaptive threshold and low-pass filter are (therefore) as follows:

$$\hat{F}^i_{c_h} = \begin{cases} \hat{F}^i_{c_f} - F^i_{th} & \text{if } \hat{F}^i_{c_f} > F^i_{th} \\ \hat{F}^i_{c_f} + F^i_{th} & \text{if } \hat{F}^i_{c_f} < -F^i_{th} \\ 0 & \text{otherwise} \end{cases} \quad (13)$$

wherein $F^i$ is the i-th component of a vector with 6 degrees of freedom containing forces and torsional moments (i.e. $F^1=f_x$, $F^4=\tau_x$).

During the man-robot interaction it is necessary to guarantee stability to make the system safe and minimize the physical force of the operator. For this purpose, the admittance control is used and the choice of the relative parameters is of the utmost importance. What is proposed here allows identification of deviations from the nominal behaviour of a robot controlled in admittance, adapting the controller parameters so as to guarantee the passivity thereof.

The choice of the parameters influences the way in which the robot interacts with the operator. For example, if the operation requires fine movements, the inertia and the damping will have high values to make the robot less reactive and obtain a more fluid movement. On the other hand, if the operation requires high speeds and accelerations, the parameters will have lower values. Furthermore, also the rigidity which the operator exerts during the interaction with the robot influences the behaviour of the system. In particular, the more rigid the operator, the farther the system moves from the ideal behaviour defined by the equation (B), vibrating and making the interaction difficult and unsafe. For this reason, deviations from the ideal behaviour must first be identified and then cancelled (or reduced), restoring the stability of the system.

What is herein proposed allows adaptation of the admittance control parameters online, during interaction between the operator and the robot. Initially a heuristic is defined to recognize the deviations of the robot from the nominal behaviour; subsequently a method is presented for adaptation of the parameters which guarantees reset of the nominal conditions, without excessively increasing the physical effort of the operator. The passivity and therefore the stability of the robot controlled in admittance is guaranteed. A less conservative solution is proposed which entails the use of virtual energy tanks, which store the energy dissipated by the system in order to subsequently re-use it.

According to some non-limiting embodiments, the inertia and damping parameters are varied (adapted) when the following inequality is not verified:

$$\psi(\dot{x},\ddot{x},F_s)=\|F_s-M_d\ddot{x}-D_d\dot{x}\|\leq\varepsilon \quad (14)$$

in which $\varepsilon>0$ is a minimum threshold obtained experimentally. As already indicated above, $M_d$ and $D_d$ are the desired inertia and damping matrix, k is the Cartesian speed and $\ddot{x}$ is the Cartesian acceleration.

Considering the dynamic behaviour of the admittance control, the behaviour of the robot when the inequality (14) is valid is defined as "nominal behaviour".

Using this equation, it is possible to define a heuristic for identification of the deviation from the nominal behaviour which occurs when, for example, the operator stiffens his arm during interaction with the robot.

Once this deviation has been identified, the admittance control parameters must be adapted. Via use of the energy tanks it is possible to define the inertia increment required to re-set the system to the nominal conditions, guaranteeing the passivity thereof.

Advantageously but not necessarily (during the learning step), the admittance control (of the control system 16) is varied (adapted) as a function of the detected force and torque $F_s$. In particular, the admittance control parameters are varied (adapted). More specifically, the inertia and damping parameters of the admittance control are varied (adapted).

According to some non-limiting embodiments, the admittance control (of the control system 16) is varied (adapted) by modifying (adapting) the parameters of the admittance control. More specifically, the inertia and damping parameters of the admittance control are varied (adapted).

According to some non-limiting embodiments, the inertia is varied by (as a function of) the following equation:

$$\tfrac{1}{2}\lambda_M\|\ddot{x}_M\|^2(t_f-t_i)\leq T(t_i)-\delta \quad (15)$$

wherein $\lambda_M$ is the maximum eigenvalue of the derivative of the inertia matrix $\dot{M}_d(t)$ in the time interval in which the parameters $$\left(\lambda_M = \max_{t \in [t_i, t_f]} \max_{j=1,\ldots,n} \lambda_j(\dot{M}_d(t))\right)$$

vary; $\|\ddot{x}_M\|^2$ is the squared norm of the maximum Cartesian speed; $(t_f-t_i)$ is the time interval in which the variation takes place; $T(t_i)$ is the energy stored in the tank at the time considered; $\delta$ is the minimum energy that must be present in the tank.

Let's assume that the desired inertia matrix and damping matrix are diagonal matrixes, as in common practice, defined according to the equations (16) and (17)

$$M_d(t)=\text{diag}\{m_1(t),\ldots,m_n(t)\} \quad (16)$$

$$D_d(t)=\text{diag}\{d_1(t),\ldots,d_n(t)\} \quad (17)$$

Since $M_d(t)$ is diagonal, also $\dot{M}_d(t)$ is diagonal and its eigenvalues are the elements on the main diagonal.

Consequently the inequality (15) can be re-written as (18)

$$\dot{m}_j(t) \leq \frac{2(T(t_i)-\delta)}{\|\dot{x}_M\|^2(t_f-t_i)} \quad \forall j=1,\ldots,n. \quad (18)$$

By calculating the integral of the inequality (18), the equation (19) is obtained.

According to some non-limiting embodiments, the inertia variation is calculated on the basis of (using) the equation (17):

$$M_d(t_f)-M_d(t_i)=\frac{2(T(t_i)-\delta)}{\|\dot{x}_M\|^2} \quad (19)$$

wherein $M_d(t_f)$ and $M_d(t_i)$ are the inertias at the initial and final times of the variation interval.

The equation (17) represents the maximum inertia variation admitted, on the basis of the energy available at time $t_i$. In practice, this value could be very high: consequently, the direct application of (19) could entail excessive inertia variations. For this reason, in some cases an upper limit ($\Delta M$) is used, experimentally defined, to the permitted inertia variation, on the basis of the following inequality (20):

$$M_d(t_f)-M_d(t_i)\leq\Delta M \quad (20)$$

Advantageously, but not necessarily, the inertia variation is calculated on the basis of (using) the equations (19) and (20), in which $M_d(t_f)$ and $M_d(t_i)$ are the inertias at the initial and final times of the variation interval.

In particular, the damping is varied so as to maintain the ratio between inertia and damping substantially constant. This allows the system dynamics to be maintained similar to those prior to the variation, which is more intuitive for the operator.

According to some non-limiting embodiments, during the learning step, the operator adjusts over time at least one operating parameter of the spraying head, and the applied operating parameter (and variation thereof in time) is substantially stored by the storage unit 8. In these cases, during the reproduction step, the control system 6 adjusts operation of the spraying head 4 so that the operating parameter stored during the learning step (and variation thereof in time) is substantially repeated. Advantageously but not necessarily, during the reproduction step, the control system 6 adjusts the operation of the spraying head 4 so that the operating parameter stored during the learning step (and variation thereof over time) is substantially repeated, in particular in a manner coordinated with the movements made by the spraying head 4.

Advantageously but not necessarily, the operating parameter is chosen from the group consisting of: adjustment of the flow (quantity per time unit) of the covering substance coming out of the spraying head 4, adjustment of the degree of pulverization of the covering substance coming out of the spraying head 4, adjustment of the width of the jet of covering substance coming out of the spraying head, adjustment of the shape of the jet of covering substance coming out of the spraying head 4 (and a combination thereof).

According to some non-limiting embodiments, said operating parameter is chosen from the group consisting of: adjustment of the flow (quantity per time unit) of the covering substance coming out of the spraying head 4, adjustment of the degree of pulverization of the covering substance coming out of the spraying head 4, adjustment of the width (or shape) of the jet of covering substance coming out of the spraying head 4 (and a combination thereof).

In some specific cases, the operating parameter comprises (is) adjustment of the flow (quantity per time unit) of the covering substance coming out of the spraying head 4.

According to some non-limiting embodiments, during the learning step, the operator adjusts in time at least one operating parameter of the spraying head 4 by acting on the driving control assembly 7, which provides indications on the operating parameter to the control system 6; the control system 6 operates the spraying head 4 as a function of the indications received from the driving control assembly 7.

Advantageously but not necessarily, during the learning step, the operator moves (in particular, adjusts over time the orientation of) the article 2 and the position is thus obtained (in particular, the orientation obtained and the variation thereof in time) is stored by the storage unit. In these cases, during the reproduction step, the control system 6 adjusts the position (orientation) of the article 2 so that the position (orientation) of the article 2 stored during the learning step (and variation thereof in time) is substantially repeated, in particular in a manner coordinated with the movements made by the spraying head 4.

According to some non-limiting embodiments, during the learning step, the driving control assembly 7 provides movement indications to the control system 6, which in turn operates the robotic arm 5 as a function of the indications received from the driving control assembly 7.

Advantageously but not necessarily, the handling device 9 comprises at least one handgrip 12 which, during the learning step, is grasped by the operator to move the spraying head 4.

In particular, the handling device 9 comprises at least two handgrips 12 which, during the learning step, are grasped by the operator to move the spraying head 4 and are connected to each other in an integral manner, in particular by means of a connection element of the handling device.

According to some embodiments, the article 2 is a ceramic article, in particular a sanitary article, for example a washbasin and/or a sink and/or console and/or shower tray.

Further characteristics of the present invention will become clear from the following description of a merely illustrative and non-limiting example.

A prototype of the plant 1 is provided according to some embodiments of the invention. In particular, the force and the torque $F_s$ were measured and the forces and torques $F_{nc}$ and $F_c$ were estimated as described above.

Figure 5:
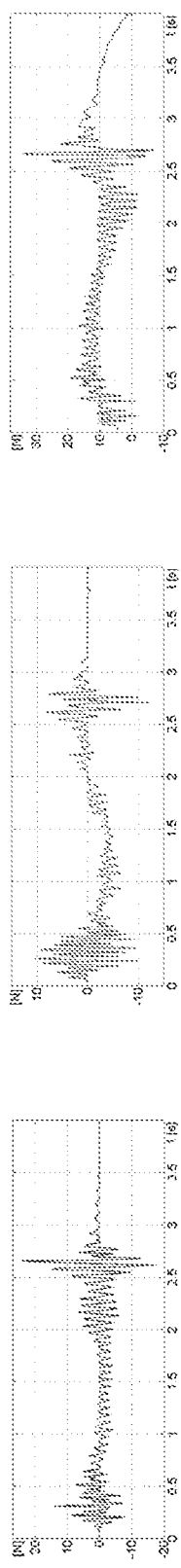
FIGS. 5 to 8 are experimental graphs obtained by using a prototype of a plant according to the present invention.
Figure 5:
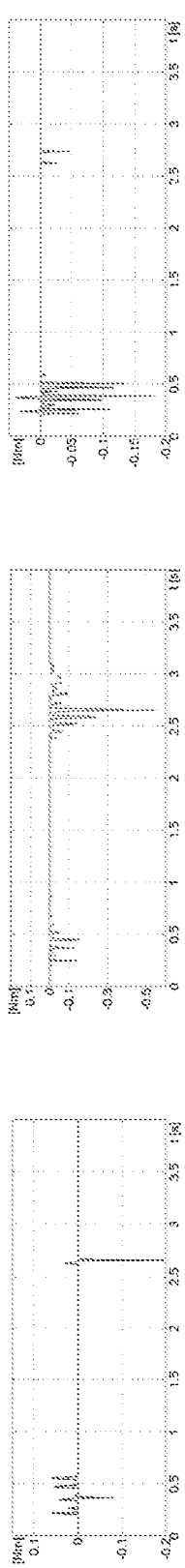
Figure 6:
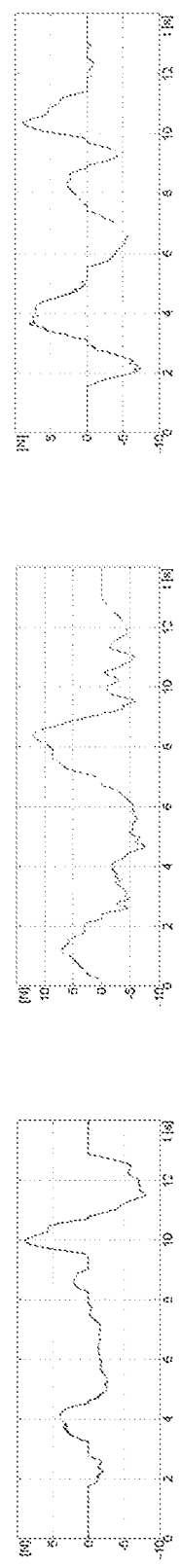
Figure 6:
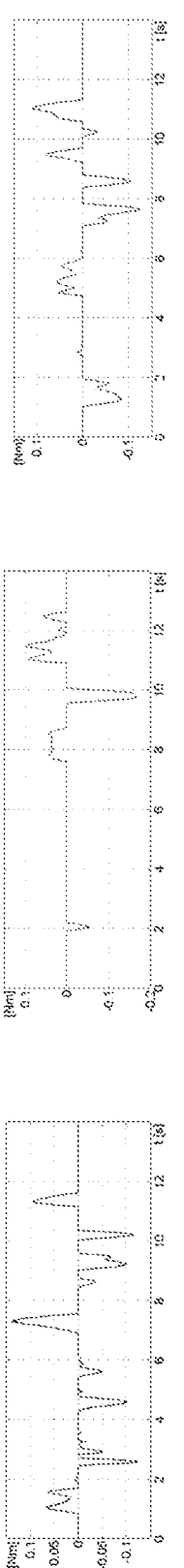
Figure 7:
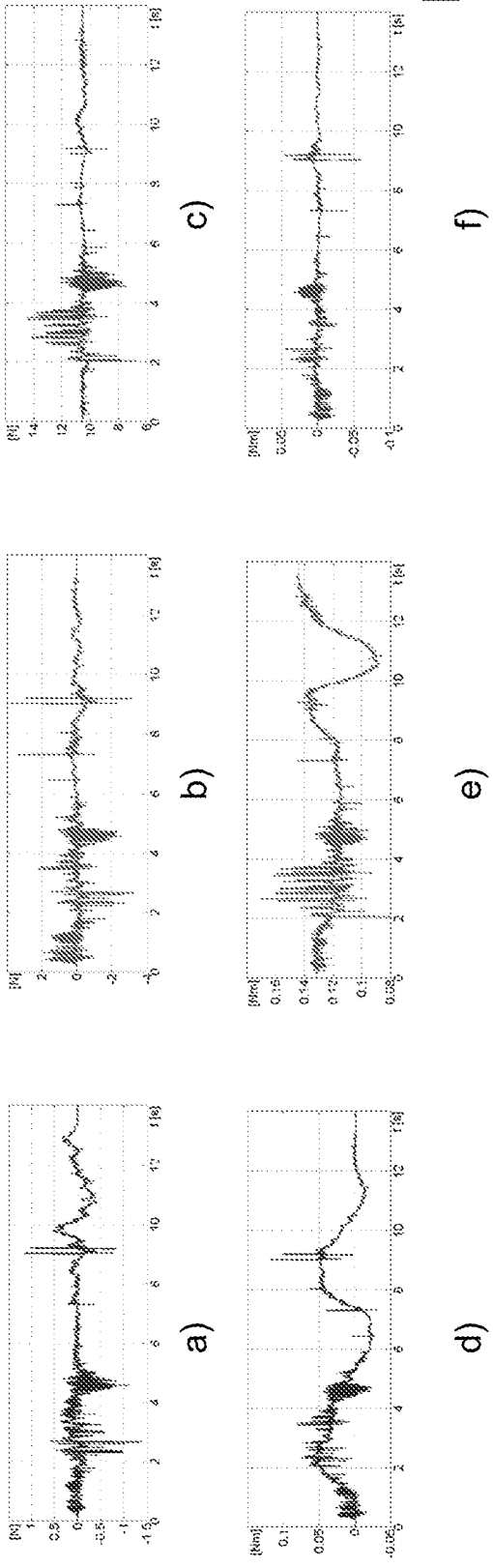

The results obtained are shown in FIGS. 5 to 7. FIGS. 5 $a$), $b$) and $c$) illustrate the force detected $F_s$ in the direction x, y and z respectively. FIGS. 5 $d$), $e$) and $f$) illustrate the torque detected in the direction x, y and z respectively. FIGS. 6 $a$), $b$) and $c$) illustrate the estimated force exerted by the operator in the direction x, y and z respectively. FIGS. 6 $d$), $e$) and $f$) illustrate the estimated torque exerted by the operator in the direction x, y and z respectively. FIGS. 7 $a$), $b$) and $c$) illustrate the estimated non-contact force in the direction x, y and z respectively. FIGS. 7 $d$), $e$) and $f$) illustrate the estimated non-contact torque in the direction x, y and z respectively.

The illustrations of FIG. 5 to 7 show that a surprisingly good compensation was obtained. In particular, comparing FIGS. 6 and 7 with FIG. 5 it can be noted that the compensation is particularly efficient, in fact the forces and torques are more fluid.

Figure 8:
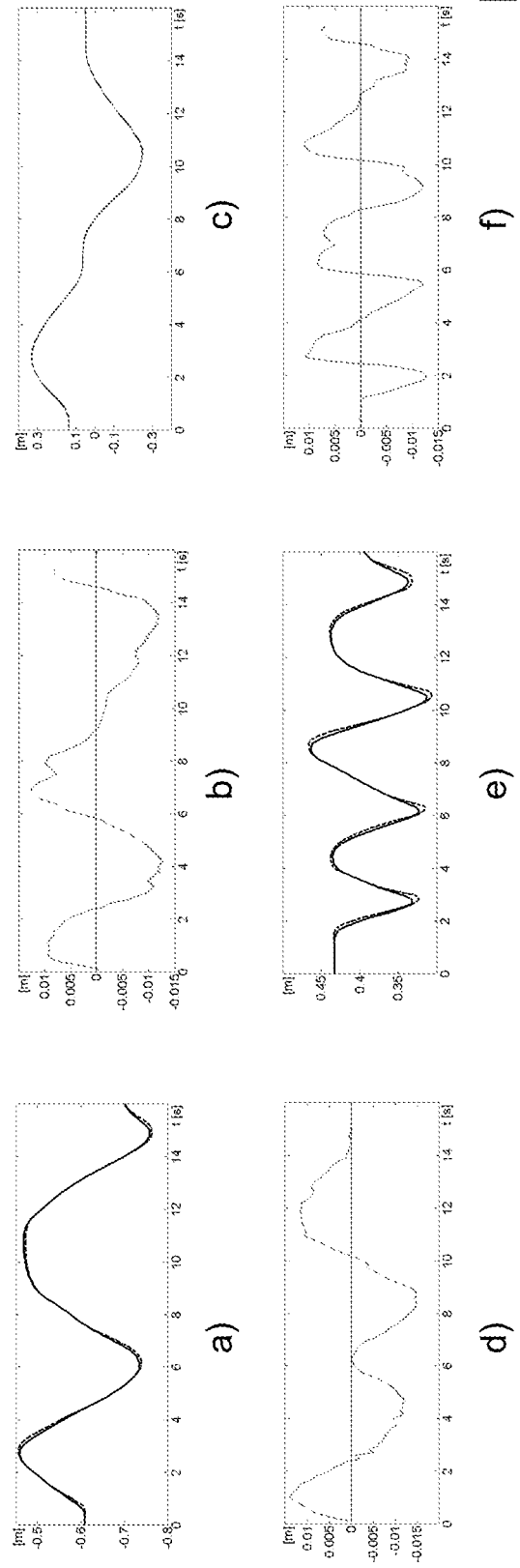
Figure 9:
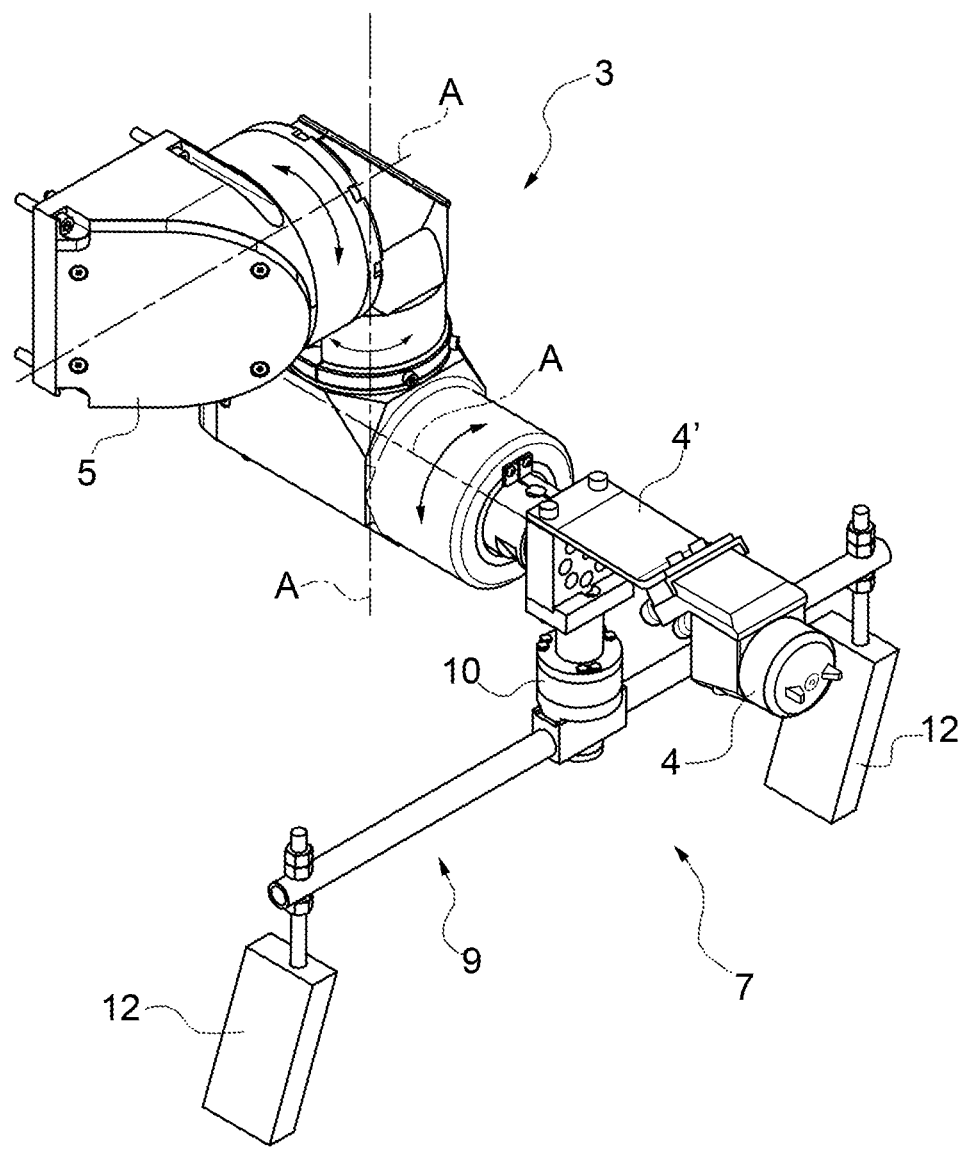
FIG. 9 is a perspective view of an alternative version of the detail of FIG. 2.

FIGS. 8 $a$), $c$) and $e$) show the trajectories in the directions x, y and z respectively, followed during the learning step (broken lines) and during the reproduction step (continuous lines). FIGS. 9 $a$), $c$) and $e$) show the differences between the trajectories in the directions x, y and z respectively, followed during the learning step and during the reproduction step. The plant 1 and the method according to the present invention are extremely precise.

The invention claimed is:

1. A method for the surface treatment of an article by means of a robotic device; the robotic device comprising a spraying head, which is designed to emit a jet of a covering substance for covering at least part of the surface of the article; a robotic arm, which is movable with at least six degrees of freedom and on which the spraying head is fitted; a control system, which comprises a storage unit and is designed to control the movement of the robotic arm so as to move the spraying head in space; a driving control assembly, which is designed to be operated by an operator so as to transfer movement indications for the robotic arm; the driving control assembly comprises a handling device; a sensor, which is connected to the handling device; and a processing system; the handling device is fitted on the robotic arm in the area of the spraying head; the handling device is connected to the robotic arm through said sensor, which is fitted on the robotic arm; the method comprising:

a learning step, during which the operator moves the spraying head by means of the driving control assembly and the movements made by the spraying head are stored in the storage unit; and a reproduction step, which takes place after the learning step and during which the control system operates the robotic arm so that the spraying head substantially repeats the movements stored by the storage unit;

wherein during the learning step, the operator exerts a force and a torque ($F_c$) upon the handling device; the sensor detects a force and a torque ($F_s$) applied to the handling device; and the processing system provides movement indications for the robotic arm as a function of the items detected by the sensor; and wherein during the learning step, an admittance control is varied as a function of the detected force and torque (Fs) and inertia and damping parameters of the admittance control are varied as a function of the detected force and torque (Fs).

2. The method according to claim 1, wherein, during the learning step, the processing system estimates a non-contact force and torque ($F_{nc}$) as a function of static and dynamic components resulting from the load of what is fitted on the sensor and obtains an estimated force and torque ($F^*_c$) applied by the operator to the handling device as a function of the detected force and torque ($F_s$) and on the estimated non-contact force and torque ($F_{nc}$); the processing system provides movement indications for the robotic arm as a function of the estimated force and torque ($F^*_c$) provided by the processing system.

3. The method according to claim 2, wherein the static components comprise gravity; the dynamic components are estimated as a function of an angular speed ω, an angular acceleration α, an linear acceleration a and an inertia of what is fitted on the sensor.

4. The method according to claim 1, wherein the control system is also designed to adjust operation of the spraying head.

5. The method according to claim 1, wherein the processing system comprises a processing unit, and the processing unit comprises a Kalman filter.

6. The method according to claim 1, wherein the handling device is fitted on the robotic arm at an end of the robotic arm; wherein, the sensor is arranged on the robotic arm between the handling device and the position in which the spraying head is fitted on the robotic arm.

7. The method according to claim 1, wherein, during the learning step, the operator adjusts in time at least one operating parameter of the spraying head and the applied operating parameter is substantially stored by the storage unit; during the reproduction step, the control system adjusts the operation of the spraying head so that the operating parameter stored during the learning step is substantially repeated so as to be substantially coordinated with the movements made by the spraying head.

8. The method according to claim 7, wherein said operating parameter is chosen from the group consisting of: adjustment of the flow (quantity per time unit) of the covering substance coming out of the spraying head, adjustment of the degree of pulverization of the covering substance coming out of the spraying head, adjustment of the width of the jet of covering substance coming out of the spraying head; adjustment of the shape of the jet of covering substance coming out of the spraying head, and a combination thereof.

9. The method according to claim 1, wherein, during the learning step, the operator adjusts in time at least one operating parameter of the spraying head by acting upon the driving control assembly, which provides the control system with indications on the operating parameter; the control system operates the spraying head as a function of the indication received from the driving control assembly.

10. The method according to claim 1, wherein, during the learning step, the operator adjusts in time the orientation of the article and the applied orientation is substantially stored by the storage unit; during the reproduction step, the control system adjusts the orientation of the article so that the orientation of the article stored during the learning step is substantially repeated so as to be coordinated with the movements made by the spraying head.

11. The method according to claim 1, wherein, during the learning step, the driving control assembly provides the control system with movement indications and, in turn, the latter operates the robotic arm as a function of the indications received from the driving control assembly.

12. A plant for the surface treatment of an article, the plant comprising:
a robotic device, which comprises:
a spraying head, which is designed to emit a jet of a covering substance for covering at least part of the surface of the article;
a robotic arm, which is movable with at least six degrees of freedom and on which the spraying head is fitted;
a control system, which comprises a storage unit and is designed to control the movement of the robotic arm so as to move the spraying head; and
a driving control assembly, which is designed to be operated by an operator so as to transfer movement indications for the robotic arm;
wherein the driving control assembly comprises a handling device, upon which, in use, the operator exerts a force and a torque ($F_c$); a sensor, which is connected to the handling device and is designed to detect a force and a torque ($F_s$) applied to the handling device; and a processing system, which is designed to provide movement indications for the robotic arm as a function of the items detected by the sensor;
wherein the storage unit is designed to store the movements made by the robotic arm while the spraying head is moved by the operator by means of the driving control assembly; and
wherein the control system is designed to control the movement of the spraying head as a function of the movements stored by the storage unit; and
wherein the control system comprises an admittance control, which is varied as a function of the detected force and torque ($F_s$), and inertia and damping parameters of the admittance control are varied as a function of the detected force and torque (Fs).

13. The plant according to claim 12, wherein the handling device is fitted on the robotic arm at the spraying head and is connected to the robotic arm through said sensor; wherein, the handling device is fitted on the robotic arm at an end of the robotic arm and the sensor is arranged on the robotic arm between the handling device and the position in which the spraying head is fitted on the robotic arm.

14. The plant according to claim 12, wherein the handling device comprises at least one handgrip, which is designed to be grasped by the operator in order to move the spraying head.

15. The plant according to claim 12, wherein the handling device comprises at least two handgrips, which are designed to be grasped by the operator in order to move the spraying head and are connected to one another in an integral manner by means of a connection element of the handling device.

16. The plant according to claim 12,
wherein the driving control assembly comprises commands, which are designed to be operated by the operator in order to adjust in time at least one operating parameter of the spraying head;
wherein the storage unit is designed to store the adjustment of the operating parameter; the control system being designed to adjust the operation of the spraying head so that the adjustment of the operating parameter is substantially repeated so as to be coordinated with the movements made by the robotic arm.

17. The plant according to claim 12 and comprising:
a device for moving the article;
the driving control assembly comprises a command, which is designed to be operated by the operator in order to control the device for moving the article;
the storage unit being designed to store the position of the article set by the operator;
the control system being designed to adjust the operation of the device for moving the article based on the position of the article stored in the storage unit.

18. The plant according to claim 12, wherein the processing system is designed to estimate a non-contact force and torque ($F_{nc}$) as a function of static and dynamic components resulting from the load of what is fitted on the sensor and is designed to obtain an estimated force and torque ($F^*_c$) as a function of the detected force and torque ($F_s$) and on the estimated non-contact force and torque ($F_{nc}$);
wherein the processing system is designed to provide movement indications for the robotic arm as a function of the force and torque ($F^*_c$) estimated by the processing system; and
wherein the dynamic components are estimated as a function of an angular speed $\omega$, an angular acceleration $\alpha$, a linear acceleration $a$ and an inertia of what is fitted on the sensor.

* * * * *